United States Patent [19]
Jackson et al.

[11] Patent Number: 6,143,217
[45] Date of Patent: Nov. 7, 2000

[54] METHOD OF MANUFACTURING A WATER HEATER

[75] Inventors: Barry Nield Jackson, Woodbury; Gary W. Gauer, Cottage Grove; Ronald Iannelli, Burnsville, all of Minn.

[73] Assignee: Water Heater Innovations, Eagan, Minn.

[21] Appl. No.: 09/315,691

[22] Filed: May 20, 1999

Related U.S. Application Data

[63] Continuation-in-part of application No. 09/211,218, Dec. 14, 1998, and a continuation-in-part of application No. 29/097,783, Dec. 14, 1998, Pat. No. Des. 421,107.

[51] Int. Cl.⁷ .......................... B29C 44/06; B29C 44/12
[52] U.S. Cl. ...................... 264/46.5; 29/455.1; 264/46.9; 264/139
[58] Field of Search .................. 264/46.5, 46.9, 264/139; 29/455.1

[56] References Cited

U.S. PATENT DOCUMENTS

| | | | |
|---|---|---|---|
| 4,372,028 | 2/1983 | Clark et al. | 264/46.9 |
| 4,447,377 | 5/1984 | Denton | 264/46.9 |
| 4,477,399 | 10/1984 | Tilton | 264/46.9 |
| 4,628,184 | 12/1986 | West | 264/46.9 |
| 4,632,792 | 12/1986 | Clark | 264/46.9 |
| 4,736,509 | 4/1988 | Nelson | 264/46.9 |
| 4,749,532 | 6/1988 | Pfeffer | 264/46.9 |
| 4,808,356 | 2/1989 | West et al. | 264/46.9 |
| 4,878,482 | 11/1989 | Pfeffer | 264/46.9 |
| 4,904,428 | 2/1990 | West et al. | 264/46.9 |
| 4,992,223 | 2/1991 | Nelson | 264/46.9 |
| 5,000,893 | 3/1991 | West et al. | 264/46.9 |
| 5,002,709 | 3/1991 | Chevalier et al. | 264/46.9 |
| 5,023,031 | 6/1991 | West et al. | 264/46.9 |
| 5,052,346 | 10/1991 | Beck | 264/46.9 |
| 5,213,728 | 5/1993 | Hickman | 264/46.9 |
| 5,229,048 | 7/1993 | Nelson | 264/46.9 |
| 5,774,627 | 6/1998 | Jackson | 392/497 |

*Primary Examiner*—Allan R. Kuhns
*Attorney, Agent, or Firm*—Moore & Hansen

[57] ABSTRACT

A method of manufacturing a double walled vessel is herein disclosed. The method involves the steps of forming an outer vessel having at least one reassembly channel formed therearound and forming an inner vessel having at least one element fitting formed integral thereto. At least one control housing is secured to the outer surface of the inner shell in registration with the element fitting. Heating elements and other control apparatus are installed in the element fittings within the control boxes. The outer vessel is sectioned at the reassembly channel, thereby allowing the inner vessel to be inserted into the outer vessel. The outer vessel is reassembled to enclose the inner vessel therein and a curable foam material is injected into the space between the inner and outer vessels to maintain a constant spatial relationship therebetween and to ensure the structural integrity of the outer vessel. Finally, a portion of the wall of the outer vessel corresponding to an open face of the control housing is removed to permit access to the interior of the control housing through the wall of the outer vessel.

11 Claims, 7 Drawing Sheets

METHOD OF MANUFACTURING A WATER HEATER

This Application is a continuation-in-part of application Ser. No. 09/211,218, filed Dec. 14, 1998, now pending, and a continuation-in-part of application Ser. No. 29/097,783, filed Dec. 14, 1998, now Pat. D421,107.

BACKGROUND OF THE INVENTION

The present invention is drawn to a method of manufacturing double walled vessels having control or other apparatus extending through the outer vessel and into the inner vessel. More specifically, the present invention is drawn to a novel method of manufacturing water heaters comprising inner and outer shells.

Most water heaters in use today are comprised of double walled vessels having an inner shell designed to contain heated water and an outer shell arranged over and around the inner shell to protect and support the inner shell. The outer shell also serves to retain a layer of insulation around the inner shell and is a mounting point for various controls used to operate and monitor the water heater. Typically, both the inner and outer shells of a water heater are fabricated from steel. However, water heaters fabricated from steel are subject to corrosion and impact damage that may adversely affect the appearance of the water heater and even render it inoperable. Furthermore, failure in a steel water heater often results in the escape of the water contained within the inner shell of the water heater thereby causing unacceptable water damage to the structure where the water heater is installed.

Standard metallic water heaters typically utilize spun fiberglass type insulation between the inner and outer shells of the vessel in order to insulate the inner shell and render the operation of the water heater more efficient. Should condensation on the pipes connecting the water heater to a water system of a structure, or a leak in those pipes, cause the fiberglass insulation to become wet, the efficiency of the water heater is greatly reduced. In addition, damp insulation may also become an incubator for organisms such as fungi or bacteria, which may cause the water heater in question to give off an unpleasant odor.

Another drawback to the use of standard metallic water heaters is that the fabrication of the water heater itself is relatively labor and material intensive. What is more, the equipment required to manufacture a metallic double walled vessel such as the standard metallic water heater described above is costly and takes up a large amount of space on a factory floor.

Therefore, it can be seen that it would be beneficial to provide a water heater which is rust proof, highly resistant to impact forces, and which is well insulated within insulation resistant to damage caused by dampness. Furthermore, it would be very beneficial to provide a method for rapidly and efficiently fabricating and assembling such a water heater.

SUMMARY OF THE INVENTION

The present invention overcomes the problems of the prior art and meets the objectives set forth above in providing a novel method of fabricating and assembling a double walled vessel such as a water heater. A method of constructing a double walled vessel according the present invention begins with the step of providing an inner shell that has a predetermined size and shape. An outer shell having a predetermined size and shape sufficient to contain therein the inner shell is also provided. The outer shell is sized such that the walls of the respective shells may be spaced apart from one another when the inner shell is received within the outer shell. The outer shell is then sectioned, i.e. has its bottom removed so as enable the insertion of inner shell into the interior of the outer shell. The inner shell may then be inserted into the outer shell and arranged in a predetermined relation to the outer shell. Finally, the outer shell is closed, as by replacing the bottom, and expandable foam is injected into the space between the inner and outer shells. The expandable foam expands to substantially fill the space between the inner and outer shells. In curing, the expandable foam becomes substantially rigid and permanently locates the inner shell within the outer shell in its predetermined relationship to the outer shell.

In providing an inner shell for use with a water heater according to the present invention, it is preferable to include the step of installing at least one element fitting integral with the wall of the inner shell. Such an integral fitting reduces the likelihood that the inner shell may leak. Where it is desirable to locate the controls for the water heater between the inner and outer shells of the vessel, it is also necessary to include the step of securing a bottom surface of at least one control housing to the outer surface of the inner shell prior to inserting the inner shell into the outer shell. A suitable control housing is sized to span the space between the inner and outer shells and has a top surface comprising a flange arranged and constructed to contact the inner surface of the outer shell in a substantially flush manner. This insures that when the foam is injected between the inner and outer shells, the rapidly expanding foam does not enter into the interior of the control housing.

In larger water heaters, more than one control housing may be secured to the outer surface of the inner shell. In this case, a conduit is preferably installed between the control housings to create a physical connection therebetween for the passage of wires and the like. Furthermore, it is preferred that the control housing be registered with the element fittings formed integral to the wall of the inner shell. Where more than one element fitting is formed integral to the wall of the inner shell, each element fitting has a control housing secured to the inner shell thereover.

In order to facilitate the sectioning and reassembly of the outer shell around the inner shell, the outer shell is preferably provided with a channel structure comprising a inner surface that is radially inwardly offset from the surface of the outer shell around the entire circumference of the outer shell. The inner surface of this channel structure is bounded at its upper and lower edges by upper and lower circumferential transition areas that join the inner surface of the channel structure to the outer surface of the shell. Sectioning the outer shell in accordance with the methods of the present invention involves removing the material of the outer shell that comprises the upper transition area of the channel structure. Removal of the upper transition structure separates the upper portion of the outer shell from a base portion of the outer shell and allows the insertion of the inner shell into the interior of the outer shell.

In order to gain access to the interior of the control housing, a portion of the wall of the outer shell registered over the open face of the control housing must be removed. Once the water heater heating elements and any control mechanisms have been installed within the control housings, a housing cover is secured over the open face of the control housing.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

DETAILED DESCRIPTION

Figure 1:
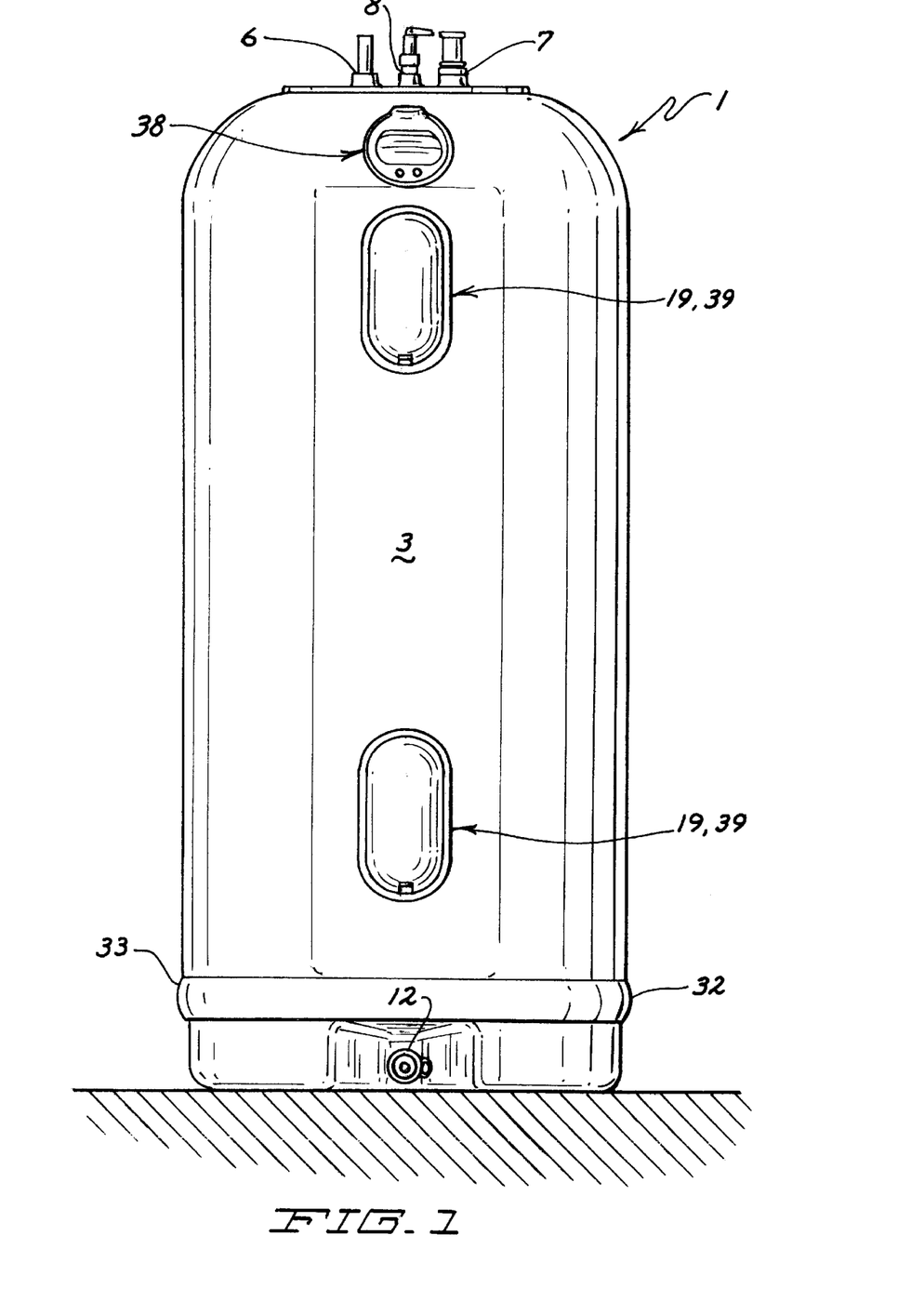
FIG. 1 is a front elevation view of a fully assembled water heater constructed according to the present invention.
Figure 2:
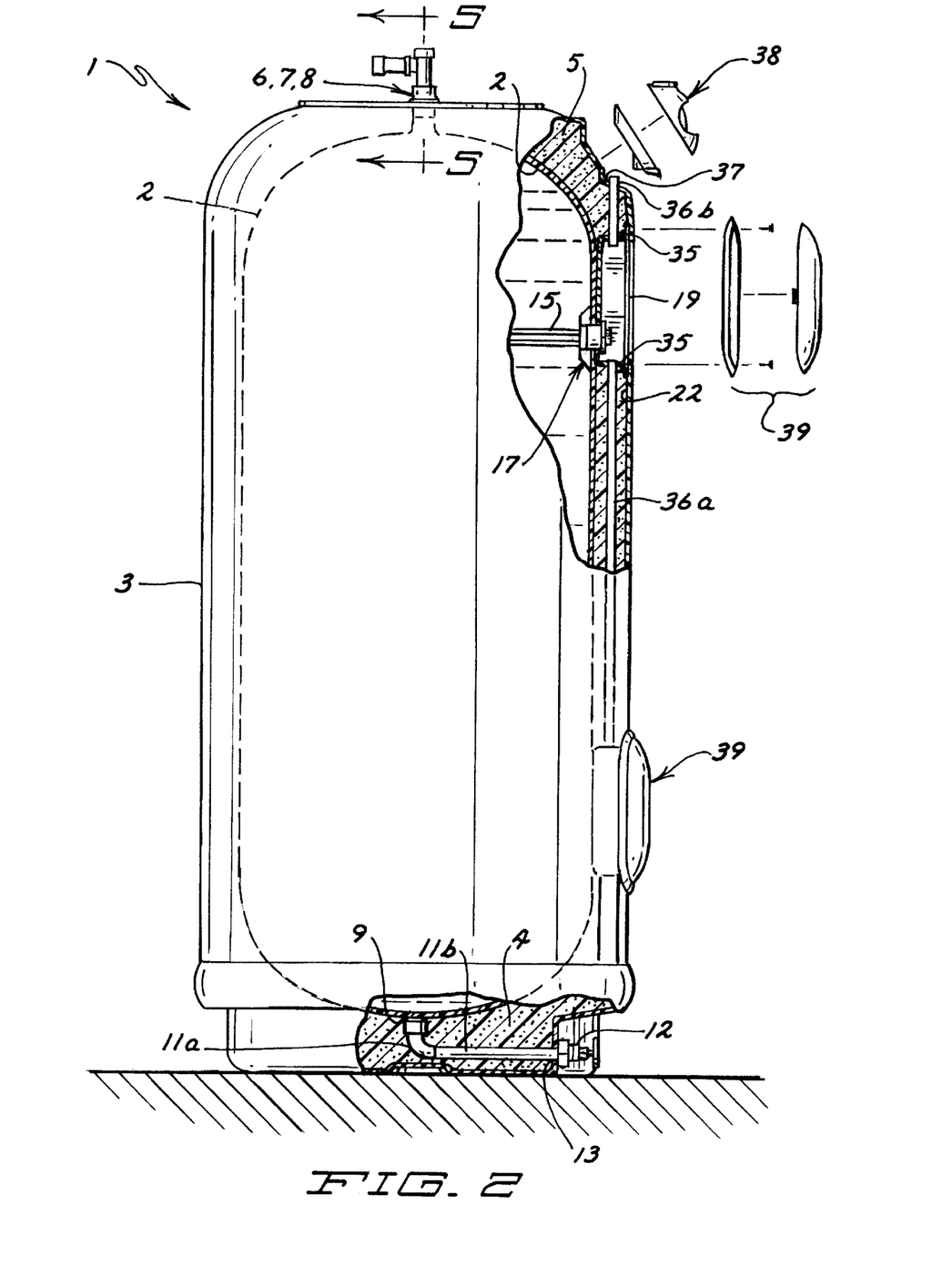
FIG. 2 is a side elevation view of the water heater of FIG. 1 that is partially broken away to show details of the structure of the water heater.

FIGS. 1 and 2 illustrate a water heater 1 manufactured according to the methods of the present invention. A water heater 1 is comprised of an inner shell 2 disposed within an outer shell 3. An interstitial or annular space 4 exists between the inner and outer shells 2 and 3 and is typically filled with an insulative material 5 which is preferably an expandable and curable foam material. The insulative foam 5 used to fill the interstitial space 4 acts to insulate the inner shell 2 from the environment in which the water heater has been installed, and, because it is substantially rigid in its cured state, also acts to secure the inner shell 2 within the outer shell 3. While the water heater 1 is a double walled vessel, the use of an expandable and curable insulated foam material 5 in the interstitial space 4 between the inner and outer shells 2, 3 effectively creates a vessel having a single, solid wall having highly insulative properties and a high resistance to impact damage.

Both the inner and outer shells 2, 3 are formed using well known extrusion molding techniques. The inner shell 2 is preferably made from a polybutylene material and the outer shell 3 is preferably made from a polyethylene material. While it is to be understood that other moldable materials may be used to form both the inner and outer shells, 2, 3, the polybutylene and polyethylene materials from which the inner and outer shells 2, 3 are made provide the required flexibility, resistance to wide swings in pressure and temperature, and the low chemical reactivities necessary to produce a water heater 1 that is resistance to physical damage, corrosion, and durable enough to last almost indefinitely. The fact that the inner and outer shells 2, 3, may be formed through an extrusion molding process, also means that the inner and outer shells 2, 3 may be quickly and inexpensively produced. Furthermore, only simple tools, such as routers, hand drills, and a sharp knife are needed to prepare the shells 2, 3 for the manufacturing process.

Figure 5:
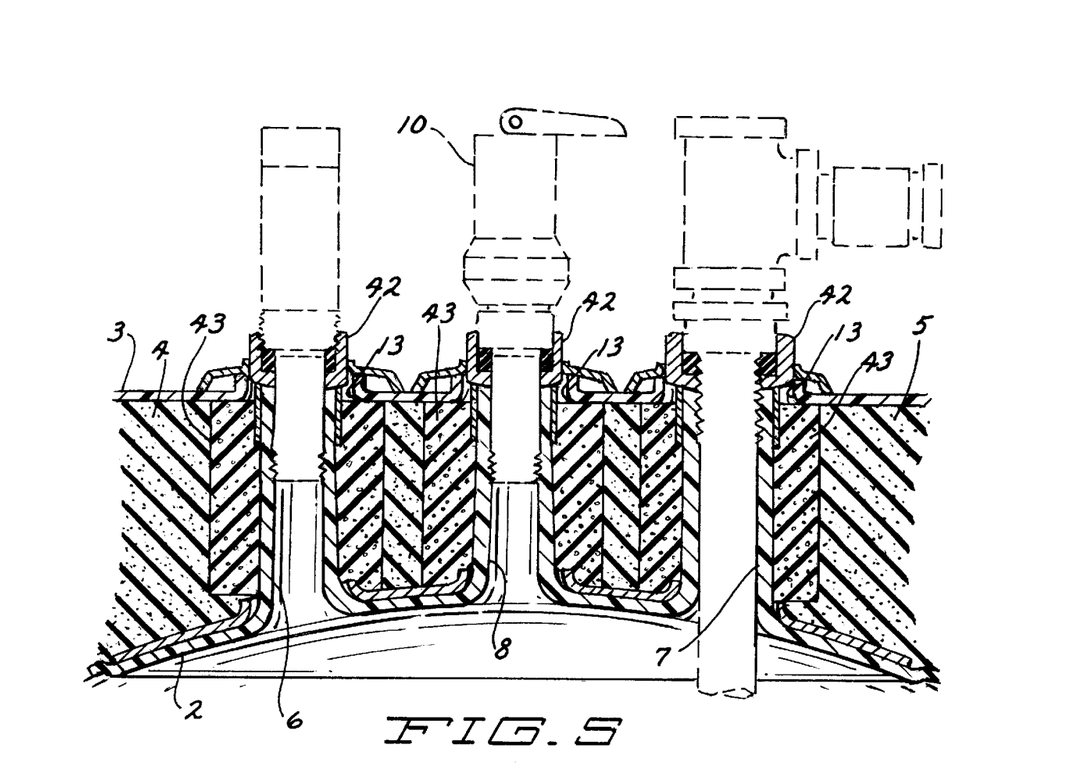
FIG. 5 is a cross-section view of the top of the water heater taken along lines 5—5 in FIG. 1.

Referring next to FIGS. 2 and 5, the structure of the inner shell 2 may be seen more clearly. The inner shell 2 is provided at its top end with three ports 6, 7, and 8. Port 6 acts as an inlet, providing a conduit whereby water may be introduced into the inner shell 2. Port 7 is an outlet whereby heated water may be removed from the inner shell 2. Port 8 acts as a vent, having a pressure valve 10 secured thereto. Where the pressure within the inner shell 2 exceeds a predetermined level, the pressure valve 10 will open to allow pressurized air or water from within the inner shell 2 to escape, reducing the likelihood of damage to the inner shell 2 of the water heater 1.

Inner shell 2 is also provided at its bottom with a drain port 9. Piping 11, comprised of segments 11a and 11b, extends from the drain port 9 through the wall of the base of the outer shell 3 and has a spigot 12 installed at the exterior surface of the outer shell 3. The drain port 9 and spigot 12 provide a means for draining the inner shell 2 of water such as when it is necessary to perform maintenance on the water heater 1.

The various ports 6–9 of the inner shell 2 are molded integral to the inner shell 2. The ports 6–9 are constructed to permit standard compression fittings comprising threaded universal unions 42 to be secured thereto so that the various water lines and pressure valves may be connected to the inner shell 2. It is preferred to utilize compression fittings as this type of fitting presents a lower likelihood of leakage than do glued in place fittings and does not present the same potential for heat damage as do brazed or soldered fittings. Furthermore, it is preferable to use universal union compression fittings 42 to avoid the need to torque the ports 6–9 molded integral to inner shell 2.

Figure 6:
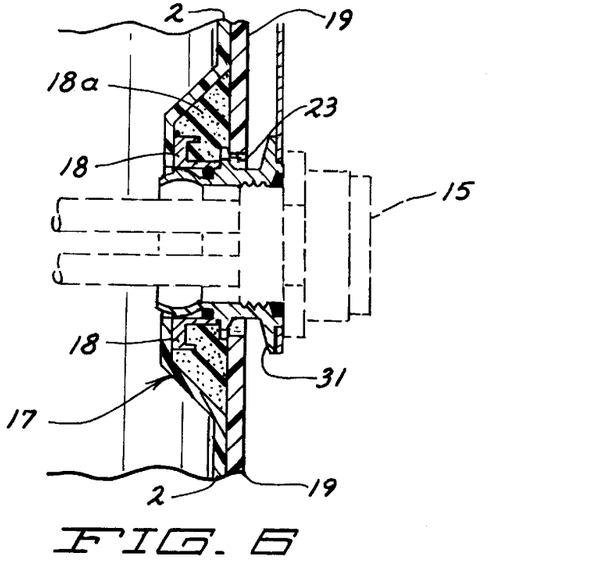
FIG. 6 is a close-up partial cross-section view of the inner tank wall showing the molded-in-place element fitting.

In order to heat water contained in the inner shell 2, it is preferred to utilize electric heating elements 15 as illustrated in FIGS. 2 and 6. A suitable electric heating element 15 is disclosed in U.S. Pat. No. 5,774,627. U.S. Pat. No. 5,774,627 is commonly assigned herewith and is hereby incorporated by reference. In order to secure an electric heating element 15 through the wall of the inner shell 2 in a manner that is both water tight and which permits the replacement of the electric heating element 15, it is preferred to mold an element fitting 17 integral to the wall of the inner shell 2. See FIG. 6. The element fitting 17 typically comprises a brass fitting 18 mounted in a flange 18a. The element fitting 17 is placed in the mold used to form the inner shell 2 and, during the molding process, the flange 18a, and hence the brass fitting 18, become integral parts of the wall of the inner shell 2. It is to be understood that the flange 18a may preferably be made from the same material from which the inner shell 21 is formed.

In larger water heaters 1 it is preferable to install upper and lower element fittings 17 in the wall of the inner shell 2 to accommodate two heating elements 15. Once an element fitting 17 is in place, an electric heating element 15, or other heating or control device, may be threaded or otherwise secured in the brass fitting 18. It is to be understood that the fitting 18 may be configured in any number of manners so long as a heating element 15 or other structure may be inserted and retained through the wall of the inner shell 2 in a water tight fashion. The brass fitting 18 may also be arranged to receive an exterior element fitting 31 that is in turn arranged and constructed to mount a heating element 15 therethrough. Furthermore, the fitting 18 may be fashioned of materials other than brass that are well suited to this application. In addition, the exterior element fitting 31 may be arranged to mount a thin plate 33 thereon. The plate 33 is typically attached to the exterior element fitting 31 after a control box 19 is mounted over the exterior element fitting 31. The plate 33 is useful for mounting control devices such as a thermostat or for printing warnings or instructions about the controls and components of the water heater 1.

Referring again to FIG. 2, in order to prevent the insulative foam material 5 from covering the heating elements 15, a control box 19 such as that described in U.S. patent application Ser. No. 09/211,218, may be installed in the interstitial space 4 between the inner and outer shells 2, 3 of the water heater 1. U.S. patent application Ser. No. 09/211,218 is commonly assigned with the present application and is hereby incorporated by reference. Referring to FIG. 2 of U.S. patent application Ser. No. 09/211,218, it can be seen that a control box 19 useful in the manufacture of a water heater comprises a substantially rectangular housing 21 having an open outer surface, the periphery of which is defined by a plurality of curvilinear segments which form a flange 22. The flange 22 is arranged to abut the inner surface of the outer shell 3 in a flush manner. Whereas the outer surface of the control box 19 is open, the curved bottom surface 25 of the control box 19 has a curvilinear shape that is complementary with the outer surface of the inner shell.

As can be seen in FIG. 2 of the present application, the control box 19 is arranged and constructed to span the interstitial space 4 between the inner and outer shells 2,3 and to contact both the inner and outer shell 2,3 in a flush manner. Preferably, the bottom surface of the control panel 19 is adhered to the outer surface of the inner shell 2 over the element fitting 17 and exterior element fittings 31. An aperture 23 is formed through the bottom surface of the control box 19 to allow access to the element fitting 17 and exterior element fittings 31. The flange 22 of the control box 19 is not adhered to the inner surface of the outer shell 3. Rather, when the inner shell 2 is inserted into the outer shell 3, the flange 22 of the control box 19 is free to slide along the inner surface of the outer shell 3. In this manner, the control box 19 helps in maintaining the preferred location of the inner shell 2 within the outer shell 3, that is, helps to maintain a substantially even interstitial space 4 around the entire surface of the inner shell 2.

When assembling water heaters 1 of varying size, it may become necessary to utilize control boxes 19 of correspondingly varying size. However, as disclosed in U.S. patent application Ser. No. 09/211,218, it is preferable to utilize a single size and style of control box 19 in the assembly of a water heater 1. Therefore, each outer shell 3, no matter the size, has at least one area of its wall that is complementary with the curvilinear flanges 22 of the standardized control box. FIGS. 3a–3d and 4, of the aforementioned patent application illustrate that each outer shell or vessel 10 has at least one area of geometric discontinuity 32 formed integral with the wall of the outer shell or vessel 10 that is arranged and constructed to be complementary with the flanges 22 of standardized control boxes 19. In this manner, the same control box 19 may be utilized with any of a series of variously sized outer shells 3.

As the control boxes 19 are typically adhered to the outer surface of the inner shells 2 over the element fittings 17, the bottom surfaces of the control boxes 19 need not be fitted flushly with the curvature of the inner shells 2. However, it is also possible to provide the inner shells 2 of variously sized water heaters 1 with at least one surface area that is complementary to the bottom surface of the control box 19. Use of a single style of a control box 19 allows a wide range of sizes of water heaters 1 to be produced using standardized molds, parts, and manufacturing equipment. This in turn reduces the cost of maintaining large inventories of variously sized parts and limits the amount of time that would otherwise be lost in modifying the molds used in the extrusion molding process to account for variations in water heater size.

As indicated above, where a water heater 1 is of sufficient size, more than one element fitting 17 will be molded integral to the wall of the inner shell 2 thereby allowing the installation of more than one electric heating element 15. Each element fitting 17 has associated therewith a single control box 19. While element fittings 17 may be located practically anywhere upon the surface of the inner shell 2, it is most expedient and preferred to align the element fittings 17 vertically upon the outer surface of the inner shell 2. In this manner, the respective control boxes 19 secured over the respective element fittings 17 will also be vertically aligned upon the outer surface of the inner shell 2. Electrical conduit ports 35 formed in control boxes 19 allow for the installation of a first length of electrical conduit 36a between the respective control boxes 19. The upper most control box 19 will also have a second length of electrical conduit 36b which extends upward through the interstitial space 4 and through an aperture 37 formed through the outer shell 3. The electrical conduit 36b passing through aperture 37 is positioned to extend into an electrical connection box 38 that is secured to the outer shell 3. Electrical conductors (not shown) are connected to the respective electric heating elements 15 and other control structures located in the respective control boxes 19 and are threaded through the various electrical conduits 36a, 36b to the electrical connection box 38. The electrical conductors which are connected to the various heating elements 15 and other control apparatus are connected to an outside power source (not shown) in the electrical connection box 38.

Figure 3:
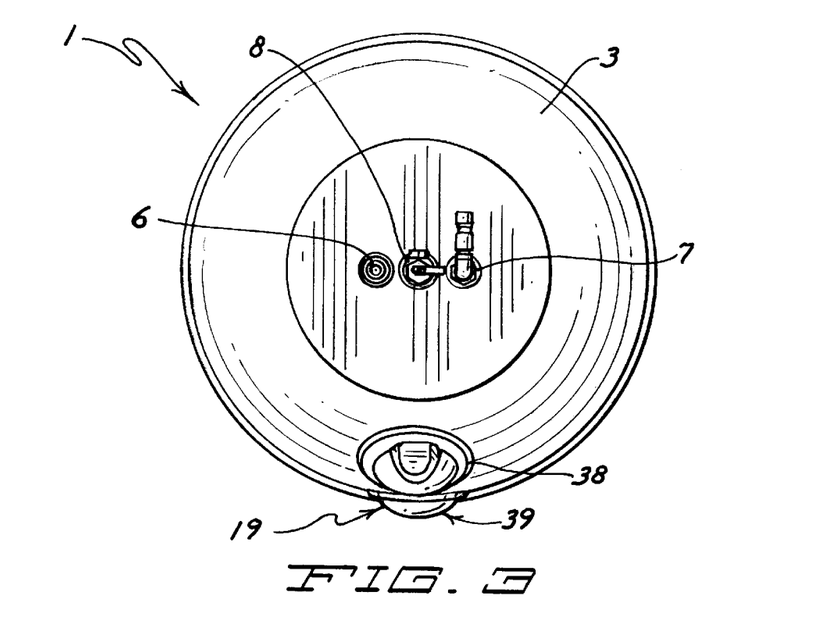
FIG. 3 is a top view of the water heater of FIG. 1.
Figure 4:
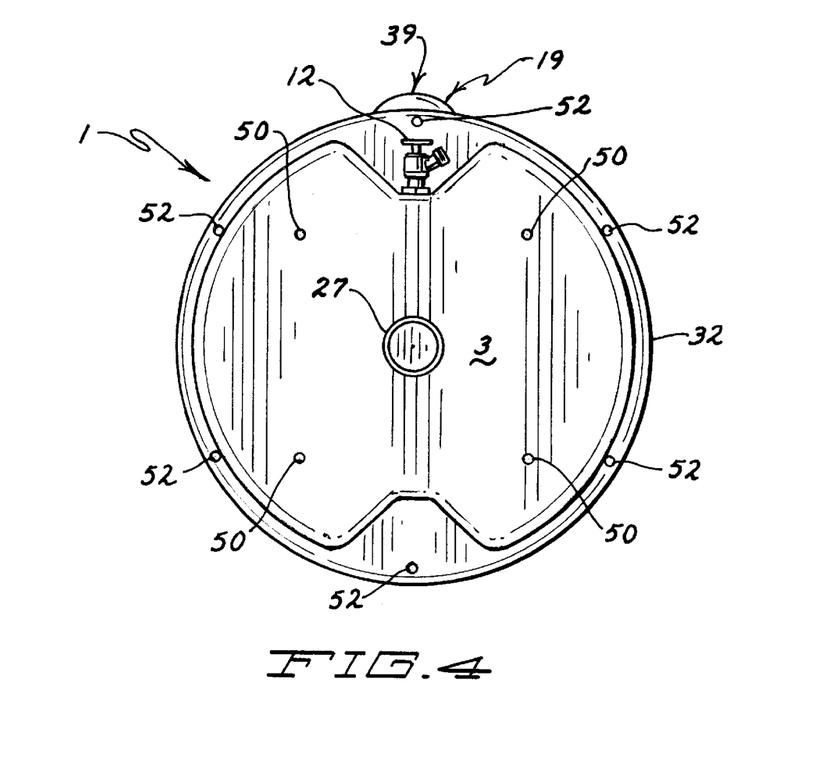
FIG. 4 is a bottom view of the water heater of FIG. 1.

The outer shell 3 is generally cylindrical and has a height and an inner diameter sufficient to receive an inner shell 2 of predetermined size. The top of the outer shell is provided with a plurality of the apertures 13 which allow the ports 6–8 to pass through the wall of the outer shell 3 so that external connections to a hot water system can be made. See FIG. 3. FIGS. 2 and 4 illustrate another aperture 13 formed through the base of the outer shell 3 that allows piping 11 to connect the drain port 9 to the externally mounted spigot 12. The size, location, and number of apertures 13 formed into the outer shell 3 depends upon the nature and number of ports formed in the inner shell 2 which require external connections to be made through the outer shell 3.

Referring generally to FIGS. 2–5, it can be seen that an outer shell 3 or vessel 10 also comprises a channel structure 20 that is formed integral to the outer shell 3. The channel structure 20 facilitates the ready sectioning and reassembly of the outer shell 3. The channel structure 20 is comprised of a circumferential channel 22 having a inner surface 24 that is substantially parallel to the wall of the outer shell 3 and which is radially inwardly offset from the wall of the outer shell 3. An upper transition area 26 and a lower transition area 28 bound the inner surface 24 of the channel 22 at its upper and lower edges. The upper and lower transition areas 26, 28 connect the inner surface 24 of the channel 22 to the wall of the outer shell 3. It is important to note that the diameter of the inner surface 24 of the channel 22 is smaller than the inner diameter of the outer shell 3. Subsequently, after the outer shell 3 has been sectioned by removal of the material comprising the upper transition area 26, the outer shell 3 may be reassembled by inserting the cylindrical inner surface 24 of the channel 22 into the inner diameter of the upper portion of the outer shell 3 in a telescoping fashion. In this manner, the outer shell 3 may be opened and the inner shell 2 of the water heater 1 and the control structures associated with the inner shell 2 may be inserted into the interior of the outer shell 3.

As indicated above, an expandable and curable insulated material or foam 5 is used to fill the interstitial space 4 between the inner and outer shells 2, 3. One of the benefits to using an expandable and curable insulative foam 5 to fill the interstitial space 4 is that the foam 5 will span the telescoping joint in the outer shell 3 created by the channel structure 20, thereby mechanically retaining the cylindrical inner surface 24 of the channel structure 20 within the inner diameter of the upper portion of the outer shell 3. In order to improve the mechanical connection between the upper and lower portions of the outer shell 3, the outer shell 3 may further comprise an outwardly extending circumferential radiused ring 32. Because the foam 5 will expand into the interior of the radiused ring 32, the shear strength of the foam 5 will prevent the bottom portion of the outer shell from moving away from the upper portion of the outer shell. In order to create a tight seal between the inner surface 24 of the channel 22 and the inner surface of the outer shell 3, a radially outwardly extending circumferential ridge structure 30 may be formed into the inner surface 24 of the channel 22. The ridge structure 30 creates a modest friction fit between the inner surface 24 of the channel 22 and the inner diameter of the upper portion of the outer shell 3 that serves to prevent the escape of the expandable and curable insulated foam 5 through the seam at the joint created by the channel structure 20.

The method of manufacturing a water heater 1 according to the present invention begins with the step of molding an inner shell 2 complete with ports 6–9 and integral element fittings 17. The water heater 1 illustrated in FIGS. 7a and 7b includes two element fittings 17 for two electric heating elements 15.

Figure 7A:
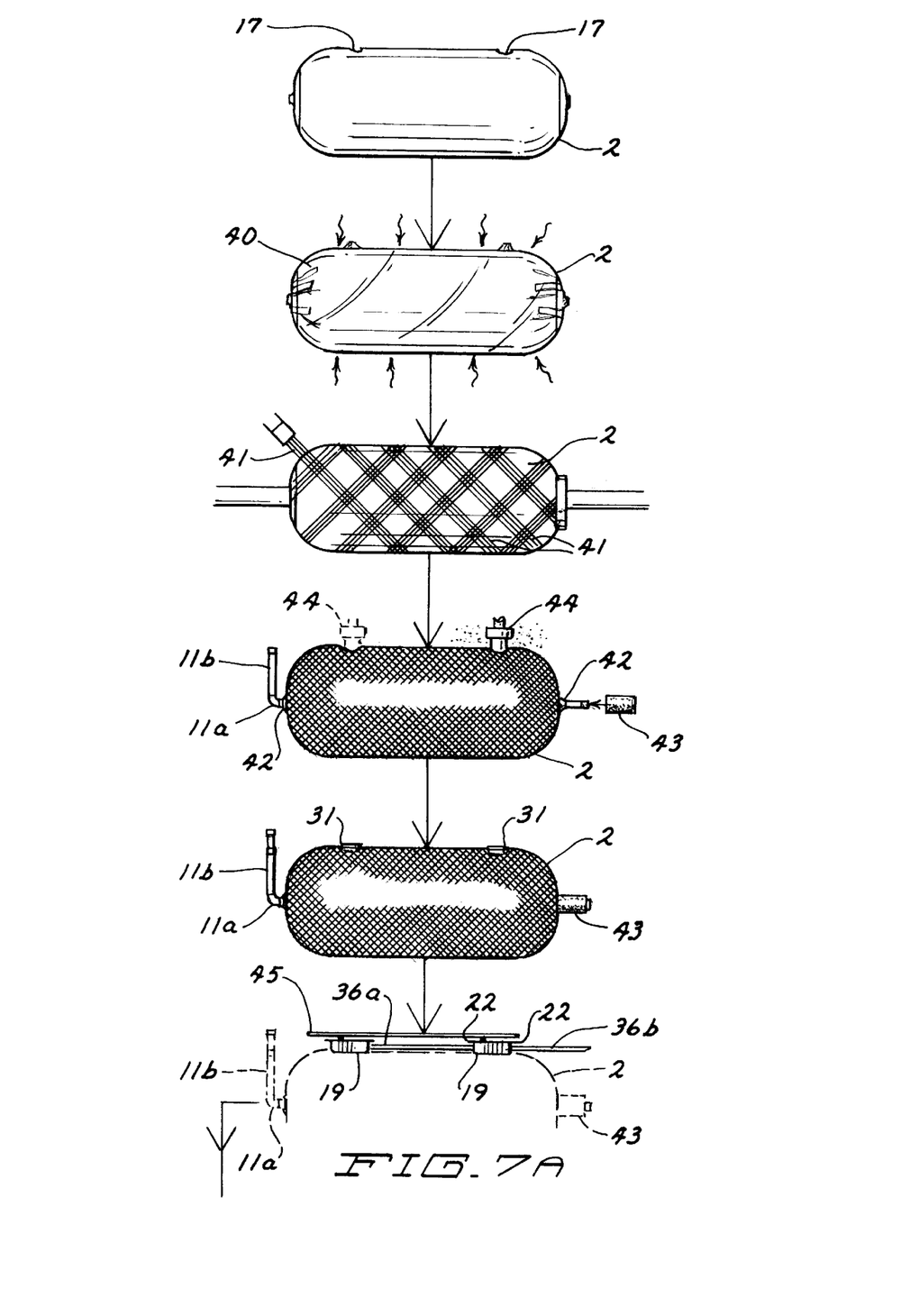
FIGS. 7A and 7B are schematic illustrations of the steps involved in manufacturing a water heater according to the present invention; and, FIG. 8 is a front close-up view of the control box of the water heater illustrating how the wall of the outer vessel is opened to expose the interior of the control box.

Next, a membrane 40, which is impervious to undesirable volatile chemicals, is wrapped around the inner shell 2. The membrane 40 prevents volatile chemicals such as styrene from migrating through the polybutylene material from which the inner shell 2 is made and into the water contained within the inner shell 2. In order to augment the pressure rating of inner shell 2, a resin impregnated fiberglass tape or band 41 is wrapped about the inner shell 2 over the membrane 40. The fiber glass tape 41 is wrapped around the tape in a helical fashion to a thickness of approximately ⅛". The wrapped inner shell 2 is then placed in an oven where the elevated temperatures rapidly cure the resin impregnated fiber tape Once the fiberglass covering 41 has been cured, threaded universal union compression fittings 42 are crimped onto ports 6–7. The threaded universal unions 42 allow water pipes to be connected to the water heater 1 without the need for a soldering or brazing operation, thereby preventing damage to the ports 6–7. Similarly, a universal union 42 is also compressed onto the drain port 9. Piping 11, consisting of an elbow 11a and nipple 11b, is then connected to the universal union 42 attached to the outlet port 9. Also at this time, a number of foam collars 43 are placed over ports 6–8. These foam collars 43 act as spacers between the inner shell 2 and the outer shell 3, helping to maintain a substantially constant interstitial space 4 between the inner and outer shells 2,3 and also helping to seal the apertures 13 around ports 6–8, preventing the escape of the insulative foam material 5 and the ingress of moisture into the interstitial space 4.

In forming the element fittings 17 integral with the wall of the inner shell 2 of a water heater 1 using an extrusion molding process, it is common for the brass fitting 18 to be blocked by a portion of the inner shell 2 wall. Furthermore, the layer of resin impregnated fiberglass 41 also obscures the fitting 18. Therefore, it is necessary to use a device, such as a standard hole saw 44 to expose the brass fitting 18, thereby allowing access to the fitting 18 and to the interior of the inner shell 2. It is preferable to expose the brass fitting 18 in a two step process. The first step involves using a large hole saw 44 typically having a diameter larger than that of the fitting 18, to cut through the layer of resin impregnated fiberglass 41 wrapped about the inner shell 2. In a second step, a hole saw 44 having a diameter somewhat smaller than that of the fitting 18 is inserted through the fitting 18 to cut a hole in the wall of the inner shell 2 which may block access to the interior of the inner shell 2. It is preferred that the hole saws 44 used in these cutting operations be equipped with vacuum probes to remove cutting debris simultaneous with the cutting operation. In this manner, no debris from the cutting operations will fall into the inner shell 2.

Next, an exterior element fitting 31 is threaded or otherwise secured in the fittings 18 of the respective element fittings 17. It is preferable to swage the exterior element fittings 31 into the brass fittings 18 so that they may not be removed. Once the exterior element fittings 31 have been secured within the respective brass fittings 18, all of the ports 6–9 and the exterior element fittings 31 are blocked so that a pressure test may be preformed on the inner shell 2. The pressure test involves placing pressurized helium within the inner shell 2 and using a helium sensitive probe to determine if there are any leaks at any of the ports 6–9 or at the exterior element fitting 31.

Figure 7B:
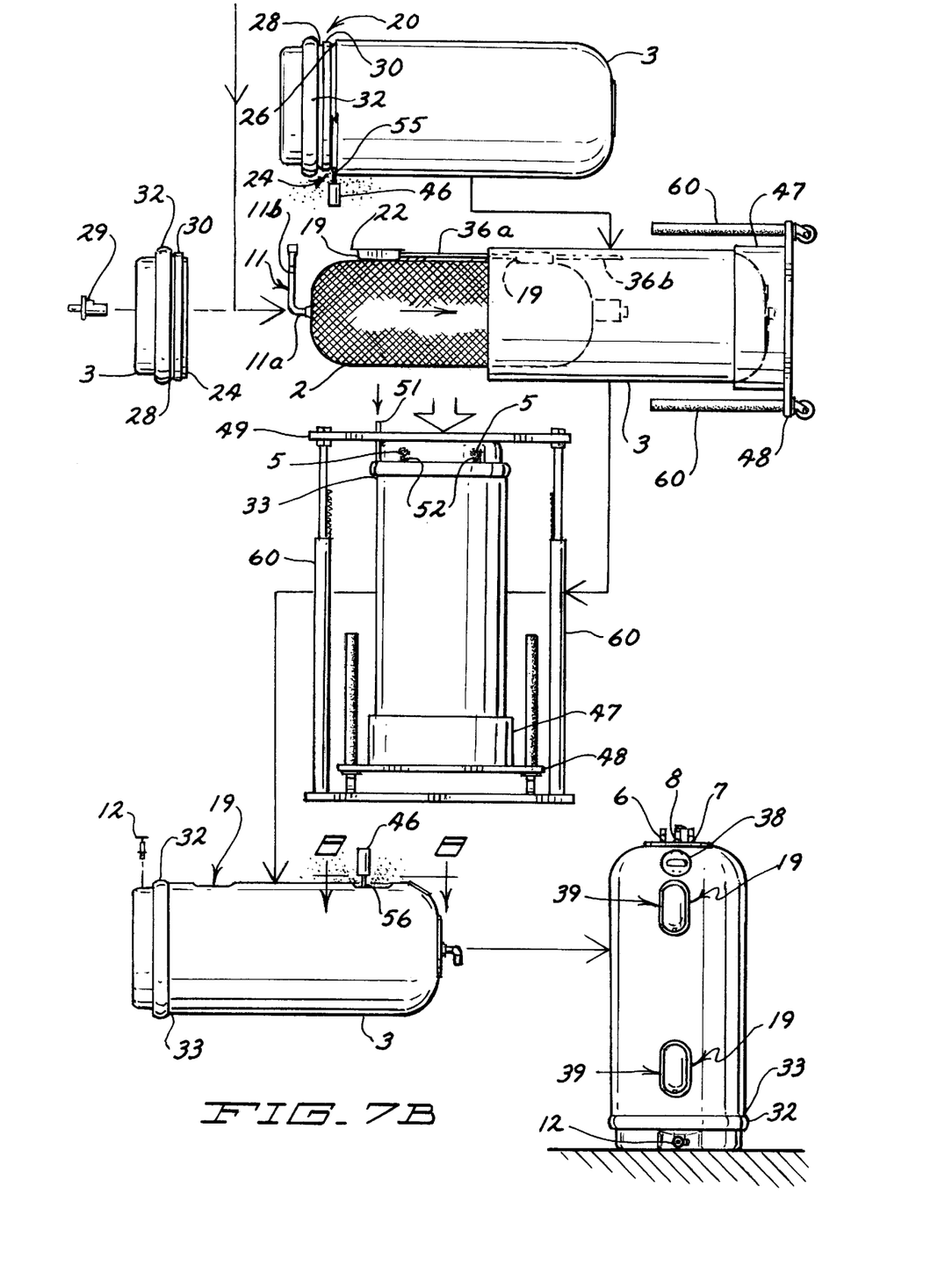

The water heater 1 illustrated in FIGS. 7a and 7b has been provided with means for mounting two electric heating elements 15. It is to be understood that a water heater 1 constructed according to the methods of the present invention may be provided with more than or less than two electric heating elements 15 without exceeding the scope of the present invention. As indicated above, control boxes 19 are adhered to the outer surface of the inner shell 2 over the exterior element fittings 31. In order to allow electrical connections to be made between the respective control boxes 19, lengths of electrical conduit 36 are secured between the control boxes 19. As illustrated in FIG. 7a, the control boxes 19 are connected by a first length of conduit 36a. Conduit 36a is received at each of its ends in respective conduit ports 35 formed in the respective control boxes 19 as shown in FIG. 2. The control box 19 located near the top of the inner shell 21 is provided with a second length of electrical conduit 36b sized to extend from an upper conduit port 35 on the uppermost control box 19 through aperture 37 in the outer shell 3. The second length of electrical conduit 36b attached to the control box 19 is arranged to provide a connection between the control boxes 19 and the electrical connection box 38 in which electrical conductors from an exterior power source are connected to the water heater 1.

It would be difficult to install a length of conduit 36a between the respective control boxes 19 after the control boxes have been secured to the outer surface of the inner shell 2. Therefore, it is preferred to pre-assemble the control boxes 19 and the respective lengths of electrical conduit 36a, 36b before the control boxes 19 are secured to the outer surface of the inner shell 2. A control box jig 45 is secured to the respective control boxes 19 in order to ensure that a control box assembly is positioned upon the outer surface of the inner shell 2 in such a manner as to allow the apertures 23 formed through the bottom surface of the control boxes 19 to be centered over the exterior element fittings 31. The control box jig 45 consists of a metal rod having brackets attached thereto at predetermined locations for the purpose of securing the respective control boxes 19 to the jig 45. The jig 45 also has means that extend into the exterior element fittings 31 so as to center the apertures 23 in the bottom surface of the control boxes 19 over the exterior element fittings 31. Prior to the placement of the control boxes 19 onto the outer surface of the inner shell 2, a suitable adhesive, such as a hot melt glue, is applied to the surface of the outer shell 2 immediately surrounding the exterior element fitting 31. Using the jig 45, the control box assembly is placed in contact with the outer surface of the inner shell 2 such that the apertures 23 of the control boxes 19 are registered over the exterior element fittings 31. Once the adhesive has cooled or cured sufficiently to secure the control boxes 19 to the outer surface of the inner shell 2, the jig 45 is removed.

Once the jig 45 has been removed from the control boxes 19, the electrical heating elements 15 and any other control apparatus such as thermostats and programmable logic controllers are secured within the respective control boxes 19. Where it is so desired, plates 33 may be attached to the exterior element fittings. Furthermore, conductors (not shown) are threaded through the respective lengths of electrical conduit 36a, 36b and are connected in a predetermined manner to the respective electric heating elements 15 and other control apparatus.

Referring now to FIG. 7b, it can be seen that the outer shell 3 must be sectioned to allow the insertion of the inner shell 2 into the interior of the outer shell 3. As shown in FIG. 7b, the outer shell 3 is sectioned by removing the material that forms the upper transition area 26 around the entire circumference of the outer shell 3. This is accomplished through the use of a tool such as a router 46 having a standard straight bit 55. Once the bottom portion of the outer shell 3 has been removed, the inner shell 2 may be inserted into the upper portion of the outer shell 3. The inner shell 2 is inserted into the upper portion of the outer shell 3 such that ports 6–8 extend through apertures 13 formed in the top of the outer shell 3. Furthermore, the curvilinear flanges 22 of the control boxes 19 will be in flush contact with the interior surface of the outer shell 3. As described above, the foam collars 43 act to maintain a predetermined distance between the tops of the inner shell 2 and the outer shell 3. The control boxes 19 also act to maintain a predetermined distance between the side walls of the inner shell 2 and the outer shell 3. The bottom portion of the outer shell 3 is then placed over the bottom portion of the inner shell 2 such that the water conduit 11 extends through aperture 13 formed through the side wall of the bottom portion of the outer shell 3. As can be seen clearly in FIG. 4, a centering aperture 27 has been formed in the center of the bottom of the outer shell 3. Once the bottom portion of the outer shell 3 has been received over the bottom of the inner shell 2 and the inner surface 24 of the channel structure 20 of the outer shell has been inserted into the interior of the upper portion of the outer shell 3, a centering pin 29 is inserted through the aperture 27 so as to engage the elbow 11a of the piping 11 attached to the drain port 9. The combination of the foam collars 42, the control boxes 19, and the engagement of the elbow 11a by the centering pin 29 all act to maintain a substantially constant interstitial space 4 between the inner shell 2 and the outer shell 3.

In this semi-assembled state, the top of the outer shell 3 of the water heater 1 is placed in a cradle 47 mounted on a cart 48. The water heater 1 is then rotated to be vertically oriented in an upside down position upon the cart 48. The cart 48 is then positioned beneath a press plate 49. A number of cylinders 60 mounted between the corners of the cart 48 and the press plate 49 compress the bottom of the outer shell 3 into the top portion of the outer shell 3. The cylinders 60 cause the press plate 49 to maintain a uniform pressure on the joint where the top and bottom portions of the outer shell 3 have been reassembled so as to ensure that the joint of a finished water heater 1 will be properly aligned. The press plate 49 has apertures formed therethrough so as to allow access to a plurality of fill holes 50 bored through the bottom of the outer shell 3. See FIG. 4.

The insulative foam material 5 is then introduced into the interstitial space 4 between the inner and outer shells through fill holes 50. Typically, a small length of flexible tubing 51 is inserted through one of the fill holes 50 into the interstitial space 4. The tubing 51 is extended around the bottom of the inner shell 2 so that foam may be injected through this flexible tubing 51 to flow into the interstitial space 4 directly to the space between the tops of the inner and outer shells 2, 3. As indicated above, the insulated foam material 5 is both expandable and curable, reacting with the moisture in the air filling the interstitial space 4 to quickly expand and fill the interstitial space 4 from the top of the water heater 1 towards the bottom of the water heater 1. The flexible tubing 51 that was used to inject the foam material 5 into the interstitial space 4 is removed from the fill holes 50 and discarded. Alternatively, the flexible tubing 51 may be dropped into the interstitial space 4 as the expandable foam material 5 will encase the flexible tubing 51 completely with no loss in insulative ability or adverse effects to the function of the water heater 1.

As the insulated foam 5 expands, air escapes through the fill holes 50 in the bottom of the outer shell 3 of the water heater 1. Indicator holes 52 are spaced equally about the underside of the radiused ring 32. See FIG. 4. Typically, somewhere between 4 and 7 indicator holes 52 are bored through the bottom surface of the radiused ring 32. The indicator holes 52 are located so that when water heater 1 is in an upright, installed position, the indicator holes 52 may not be seen. Air displaced by the rapidly expanding foam 5 also escapes through the indicator holes 52. As the foam expands into the bottom of the outer shell 3, the foam will exert force on the bottom of the outer shell 3 that would tend to eject inner surface 24 of the channel structure 20 from the interior of the upper portion of the outer shell 3. Furthermore, quantities of the expanding foam material 5 will escape from the indicator holes 52. Where the expandable foam material 5 escapes from all of the indicator holes 51 bored through the undersurface of the radiused ring 32, one can be assured with reasonable certainty that the entire interstitial space 4 between the inner and outer shells 2, 3, has been filed by the expandable foam material 5. Where one or more the indicator holes 52 remain clear of the foam material 5, it is likely that there exits an air pocket within the interstitial space 4. In this instance, the water heater would be rejected.

Figure 8:
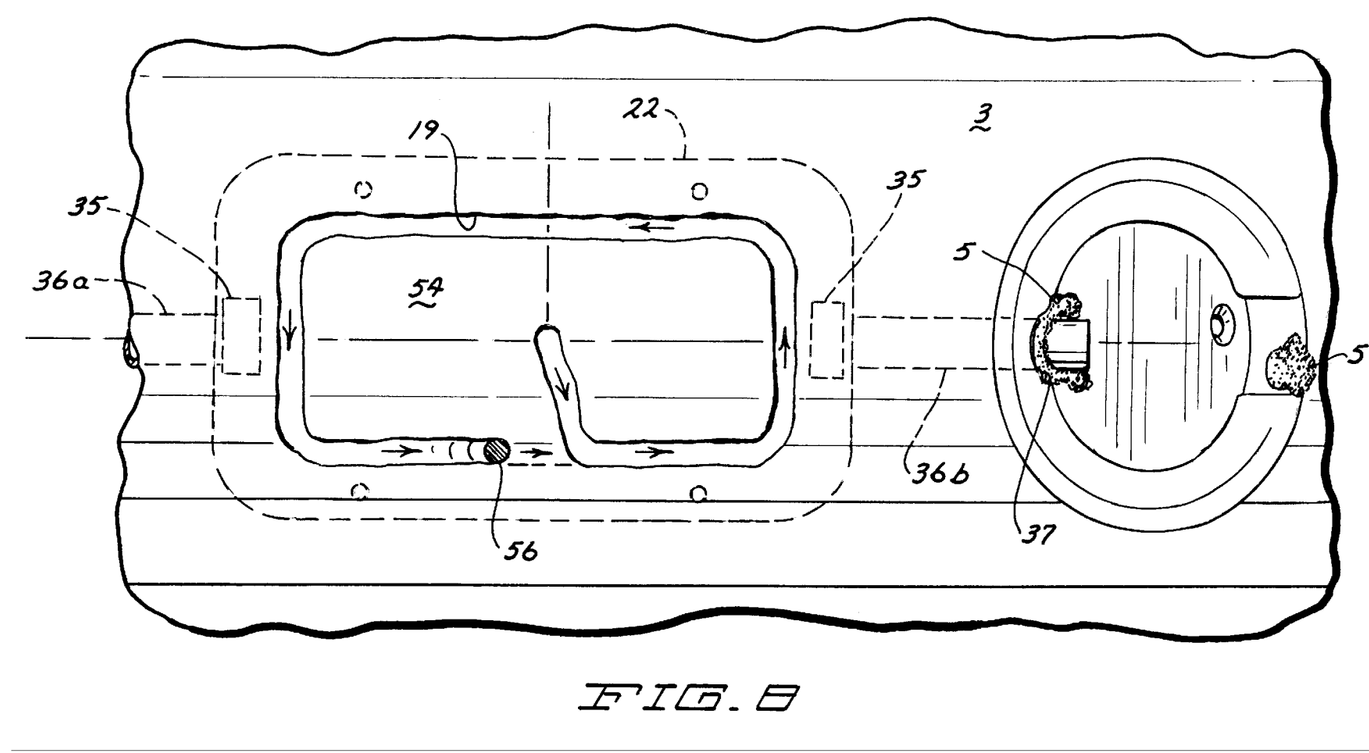

Once a predetermined amount of time has passed and the foam material 5 has cured, the centering pin 29 is removed and the water heater 1 is tipped back onto its side and the spigot 12 is attached to the piping or conduit 11. Next, a router 46 having a standard flush-cutting bit 56 of the type typically used to trim laminate materials, is used to make a plunge cut through the wall of the outer shell 3 over the open face of the control box 19 bounded by the flange 22 as illustrated in FIG. 8. The flush cutting bit held in the router 46 is then moved into contact with the side walls of the control box 19 and is moved around the entire perimeter of the open face of the control box 19 to cut away waste portion 54 and expose the entire interior of the control box 19. The waste portion 54 of the outer shell wall corresponding to the open face of the control box 19 is removed and discarded. A control box cover 39 as described in co-pending U.S. patent application Ser. No. 09/211,218 and comprising an intermediate plate and domed cover panel are secured to the exterior of the outer shell 3 over the control box 19.

Finally, the electrical connection box 38 is secured to the surface of the outer shell 3 at the upper end of the conduit 36b extending through aperture 37.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method of constructing a double walled vessel, the walls of the double walled vessel comprising an inner shell and an outer shell, respectively, and wherein the outer shell comprises a channel structure formed around the circumference thereof, the channel structure comprising a inner surface that is inwardly and radially offset from the surface of the outer shell around the circumference of the outer shell, the inner surface being bounded by upper and lower circumferential transition areas which loin the inner surface of the channel structure to the outer surface of the shell, the method comprising the steps of:

providing an inner shell having a predetermined size and shape;

providing an outer shell having a predetermined size and shape sufficient to contain therein the inner shell such that the walls of the respective shells are spaced apart from one another to define an annular space therebetween;

sectioning said outer shell so as to enable the insertion of the inner shell into the interior of the outer shell by removing the material of the outer shell comprising the upper transition area of the channel structure, thereby separating the upper portion of the shell from a base portion of the shell so as to enable the insertion of the inner shell into the interior of the outer shell;

arranging the inner shell within the outer shell in a predetermined relation to the outer shell;

reassembling and thereby closing the outer shell around the inner shell; and injecting an expandable foam into the annular space between the inner and outer shells, the expandable foam expanding to substantially fill the space between the inner and outer shells, the expandable foam becoming substantially rigid after a predetermined cure time so as to permanently locate the inner shell within the outer shell in its predetermined relationship to the outer shell.

2. The method of claim 1 further comprising the step of:

installing at least one element fitting integral with the wall of the inner shell.

3. The method of claim 2 further comprising the step of:

securing a bottom surface of at least one control housing to the outer surface of the inner shell in registration with the element fitting formed integral to the wall of the inner shell, the control housing being sized to span the space between the inner and outer shells, the control housing having a top surface comprising an open face surrounded by a flange arranged and constructed to contact the inner surface of the outer shell in a substantially flush manner.

4. The method of claim 2 further comprising the steps of:

securing a bottom surface of at least two control housings to the outer surface of the inner shell, each in registration with an element fitting formed integral to the wall of the inner shell, the control housings being sized to span the space between the inner and outer shells, each control housing having a top surface comprising an open face surrounded by a flange arranged and constructed to contact the inner surface of the outer shell in a substantially flush manner, and installing a conduit between the control housings to create a physical connection therebetween.

5. The method of claim 1 further comprising the step of:

securing a bottom surface of at least one control housing to the outer surface of the inner shell, the control housing being sized to span the space between the inner and outer shells, the control housing having a top surface comprising an open face surrounded by a flange arranged and constructed to contact the inner surface of the outer shell in a substantially flush manner.

6. The method of claim 5 further comprising the step of:

removing a portion of the wall of the outer shell registered over the open face of the control housing to gain access to the interior of the control housing.

7. The method of claim 6 wherein:

a portion of the wall of the outer shell is removed by cutting through the wall of the outer shell along a cutting path defined by the flange of the control housing.

8. The method of claim 3 further comprising the step of:

installing a heating element and a control apparatus in at least one control housing, and securing a control housing cover to the outer surface of the outer shell over the open face of the control housing.

9. The method of claim 1 further comprising the steps of:

securing a bottom surface of at least two control housings to the outer surface of the inner shell, the control housings being sized to span the space between the inner and outer shells, each control housing having a top surface comprising an open face surrounded by a flange arranged and constructed to contact the inner surface of the outer shell in a substantially flush manner, and installing a conduit between the control housings to create a physical connection therebetween.

10. The method of claim 1 further including the step of:

re-assembling the outer shell around the inner shell by inserting the inner surface of the channel structure into the inner diameter of the upper portion of the outer shell.

11. A method of manufacturing a double walled vessel comprising inner and outer vessels so as to provide access to the inner vessel through the outer vessel, the method comprising the steps of:

forming an outer vessel having at least one reassembly channel formed therearound;

forming an inner vessel having at least one element fitting formed integral thereto;

sectioning the outer vessel at the reassembly channel;

securing a bottom surface of at least one control housing to the outer surface of the inner shell such that an aperture formed in the control housing is in registration with the element fitting formed integral to the wall of the inner shell, the control housing being sized to span the space between the inner and outer shells, the control housing having a top surface comprising an open face surrounded by a flange arranged and constructed to contact the inner surface of the outer shell in a substantially flush manner;

inserting the inner vessel into the outer vessel so that the control housing is in substantially flush contact with the inner surface of the outer vessel;

reassembling the outer vessel to enclose the inner vessel therein;

injecting a curable foam material into the space between the inner and outer vessels to maintain their constant spatial relationship and to ensure the structural integrity of the outer vessel; and, removing a portion of the wall of the outer vessel corresponding to the open face of the control housing to permit access to the interior of the control housing.

* * * * *